Figure 1:
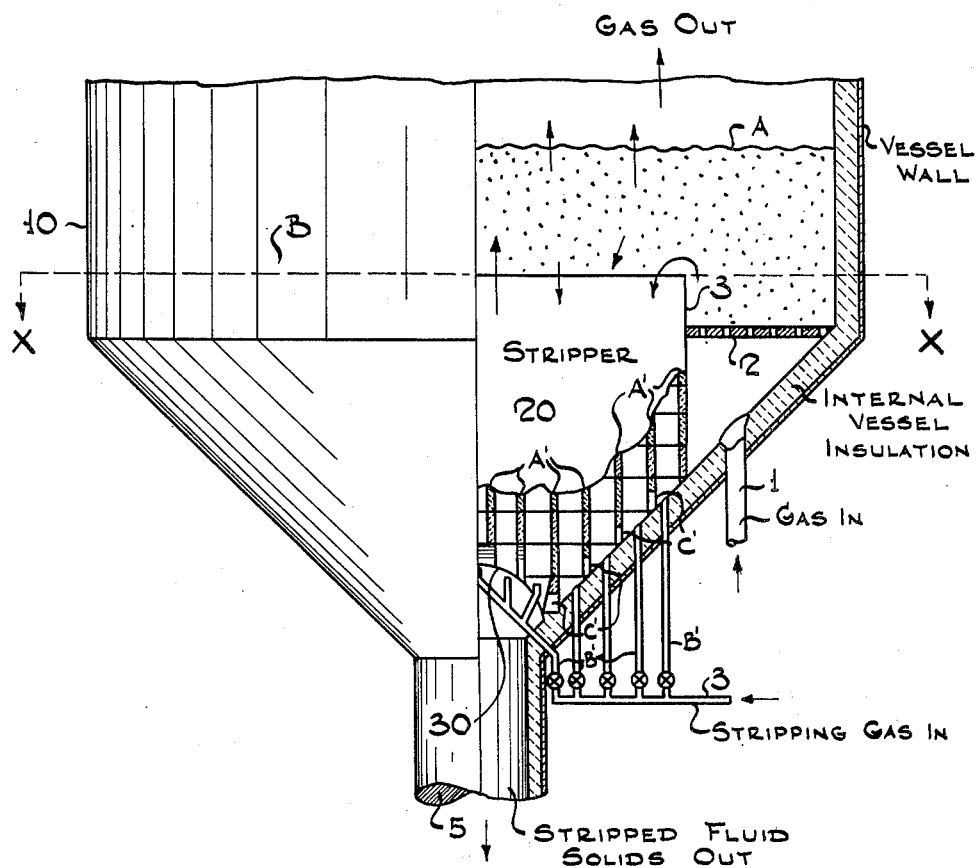

Feb. 24, 1953     F. T. BARR     2,629,653
FLUID CONTACTING APPARATUS

Filed Oct. 25, 1946     2 SHEETS—SHEET 1

Frank T. Barr, Inventor
By P. J. Whelan, Attorney

Patented Feb. 24, 1953

2,629,653

UNITED STATES PATENT OFFICE 2,629,653

FLUID CONTACTING APPARATUS

Frank T. Barr, Summit, N. J., assignor to Standard Oil Development Company, a corporation of Delaware Application October 25, 1946, Serial No. 705,697

3 Claims. (Cl. 23—288)

The present invention is concerned with an improved high temperature stripper suitable for removing gases, vapors and the like from fluidized solid particles. The invention more particularly relates to an improved hydrocarbon synthesis process and is concerned with a high temperature stripper suitable for use in the preparation of the synthesis gas. The high temperature stripper of my invention is built so that all stripper parts are under compressive stress only, thus permitting the use of refractory construction materials.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or on suitable carriers, such as kieselguhr, diatomaceous earth, synthetic gels, silica and alumina. Promoters such as oxides of chromium, zinc, aluminum, magnesium and the rare earth metals are used with the iron group metals. These catalysts are employed either in fixed bed or in fluid catalyst operations.

The temperatures employed in the synthesis reaction vary widely, as for example, in the range from about 300° F. to about 800° F. and are generally in the range from about 350° F. to about 700° F. The pressures likewise vary considerably and are a function of other operating conditions, such as catalyst employed, activity of the catalyst, character of the feed gases, and the temperatures utilized. Pressures in the range from about 1 to 100 and higher atmospheres have been suggested. The character of the feed gases introduced into the synthesis reaction zone depends somewhat on the particular temperatures and pressures and upon the catalyst employed. For example, when employing cobalt type catalysts, it is preferred to use about 1 mol of carbon monoxide to about 2 mols of hydrogen, while when an iron catalyst is utilized equal mols of hydrogen and carbon monoxide in the feed synthesis gases can be used.

My invention is particularly concerned with the production, for use as synthesis feed gas, of a mixture of hydrogen and carbon monoxide from carbonaceous materials, as from methane or natural gas, or from solid fuels such as coal or coke, and consists in oxidizing the carbonaceous material by means of oxygen-containing substances under conditions such as to supply the necessary endothermic heat of reaction. Thus the oxidation may be carried out at least in part by means of free oxygen, so that heat is supplied by combustion of the carbonaceous material with this oxygen. Alternatively, the oxidation may be carried out with steam or carbon dioxide, or mixtures thereof, with heat of reaction supplied by circulating hot solids using the fluid technique. Still another basic method of operation involves the supply of free oxygen by means of an oxygen carrier, such as a metal oxide, which may easily be circulated to the gasification zone using the fluid technique. In any of the methods of operation involving the circulation of fluidized solids to and from the gasification zone, it is desirable to free the solids coming to the gasification zone of occluded gas or vapor which would otherwise dilute or render impure the gas produced, and to recover from the solids leaving the gasification zone occluded gas which would otherwise represent lost production. These separations are most suitably made by providing stripping zones through which the circulating solids must flow, and in which the occluded gas is partially or practically completely separated from the fluidized solids and replaced by gas (or vapor) less harmful to efficient operation.

Design and operation of strippers for treating circulating fluidized solids have already been described, e. g., in copending applications by Ogorzaly et al., Serial Nos. 545,669, now Patent No. 2,467,850; 551,028, now Patent No. 2,436,225, and 553,730, now Patent No. 2,415,755. These applications give information on rates of solid and gas flow, size and effectiveness of stripper cells, and basic considerations of mechanical design. In these designs utilization of metal as material of construction for the stripper and its internal fittings is contemplated.

The operation of processes for oxidation of carbonaceous materials to produce hydrogen-carbon monoxide mixtures is ordinarily carried out at temperatures above 1500° F.; favorable process results are often obtained by employing temperatures above 2000° F. At such level the use of ordinary metals, i. e., steels, as material of construction is impossible, and use of the best practicable high alloy steels will allow operation at little higher than 1800° F. Previous designs for fluidized solids strippers have required the use of materials of relatively high tensile strength, which effectively limits the selection to metals.

It is a primary purpose of my invention to make possible the construction and operation of circulating fluidized solids strippers for use at relatively high temperatures, i. e., at temperatures above those at which metallic construction can be used. It is a further purpose to provide a stripper in which all elements at operating temperature are under compressive stress only, with essentially no tensile stress impressed, by virtue of which ceramic materials resistant to temperatures of 3000° F. and higher may be employed for stripper construction.

As an example of the adaptation of my invention to a high-temperature circulating fluidized solids system, I shall describe its use in connection with the gasification of solid carbonaceous material with steam using the fluid technique, with supply of endothermic heat of reaction by circulation of hot fluidized solids from a separate heating vessel, as is described in copending application Serial No. 609,662, now Patent No. 2,579,398 C. I. P. of Serial No. 487,187, now Patent No. 2,579,397 by Roetheli. It will be understood that the invention may be applied to other systems mentioned herein, as well as to processes not explicitly referred to, but which require circulation of fluidized solids at temperatures higher than can be handled with metallic construction.

For production of 175,000,00 C. F. D. of carbon monoxide plus hydrogen from carbonaceous solids in a fluidized solids generator vessel, operating at 100° F. lower temperature than the fluidized solids heater vessel, circulation of about 150–200 T./M. of fluidized solids, comprising mainly ash from the feed, from the heater to the generator vessel is required. This provides heat for at least partial preheating of the 175,000–250,000 lbs. per hour steam charged to the generator and for the endothermic generation reaction. About 175,000,000–250,000,000 C. F. D. of air is charged to the heater vessel to produce by combustion of carbonaceous material the heat transferred to the generator vessel by means of the circulating solids. In order to free the circulating solids leaving the heater of occluded flue gas which would dilute the make gas if allowed to enter the generator, the fluidized solids stream is led through a stripping zone in which it is treated with stripping steam. In order to recover make gas occluded in the circulating solids leaving the generator, this fluidized solids stream is conducted through another stripping zone in which the occluded make gas is displaced with stripping air or flue gas.

For operation of the fluidized solids reaction vessels at 35–50 pounds' gauge pressure and 1800–2000° F., the stripping steam described above will be 10,000–20,000 lbs. per hour, and the stripping air in the order of 15,000,000 C. F. D. It will be understood that the amount of stripping gas may be varied widely to obtain optimum balance of make gas purity and plant capacity. Each of the strippers as described in greater detail below should provide 10–20 feet of vertical fluidized solids flow path with a clear cross-sectional area for flow of 350–500 square feet.

The general process of my invention and its adaptation to the synthesis gas manufacture system described above may be readily understood by reference to the accompanying drawings illustrating a modification of the same. My invention will be described in connection with the production of synthesis gases from carbonaceous materials by treatment with steam in a two-vessel, hot circulating fluidized solids system. The vessel shown may be construed as either the heater vessel or the generator vessel, operation of the stripping process being similar in both locations. Considering it as the generator, steam, which may contain the circulating solids fed from the heater, is introduced into reaction zone 10 by means of line 1, which is preferably duplicated in radial symmetry around the vessel. The gases and the suspended particles flow upwardly into reaction zone 10 and are distributed throughout the cross-sectional area of zone 10 by means of distributing grid 2. An upper level of the fluidized bed is maintained at point A. The reactant gases pass upwardly through zone 10 and are removed from an upper section by any desirable means.

In accordance with my invention, I dispose within reaction zone 10 a stripper means 20, the upper level of which is at point B. Stripper means 20 comprises a concentric series of cylindrical elements or baffles A'. These cylindrical elements comprise refractory material and are shaped and stacked as shown so as to be subject to compressive stress only. The cylindrical elements are supported by the bottom cone of reaction vessel 10. In accordance with my process, fluidized solids flow over the upper edge of stripper 10 and downwardly between cylindrical element A', which are further subdivided if desired as shown in the plan view of Figure 2. As the solid particles flow downwardly between the cylindrical elements, stripping gas is introduced into these areas by means of line 3 and leader lines B', which are repeated around the vessel in radial symmetry. Provision is made for allowing fluidized solids moving down through the stripper near the perimeter to move toward the solids outlet connection, which will ordinarily be near the center of the vessel. This is suitably done by providing cut-outs C at the bottom of the cylindrical elements through which solids may flow along the cone toward discharge line 5. Such provision must be made to handle solids from every cell. Also an arch 30 with suitable openings is used to support the baffles above the discharge connection. The stripped fluid solids are withdrawn from the stripper means by line 5. Stripping gas inlets are placed so as to provide controllable flow of stripping gas through each vertical cell. These are located with respect to the baffle cut-outs so as to avoid carrying of the stripping gas from one cell to the next by the fluidized solids moving toward the discharge connection. Alternately the stripping gas may be conducted upwardly in each individual cell to a point above the baffle cut-outs by means of a refractory inlet pipe leading from the external connection.

Gas forced out of the solids moving downwardly through stripping means 20 by displacement with stripping gas moves upwardly through the corresponding vertical channels or cells into reaction zone 10 and is combined with product gas moving out as indicated.

It will be understood that stripping zone 10 is arranged in radial symmetry to obtain best distribution of solids flow. As has been indicated, however, distribution of stripping gas through inlet lines B' may be adjusted radially, peripherally, or both, to balance any unevenness in solids flow and obtain optimum stripping conditions in each cell.

Figure 2:
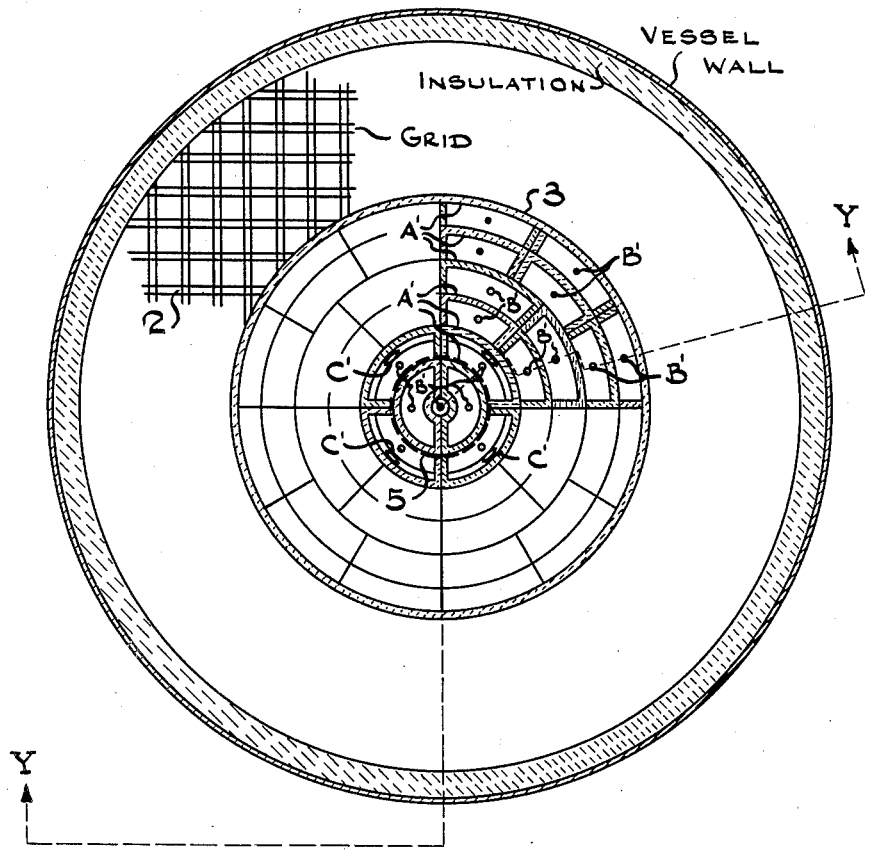

While a cylindrical form of assembly is shown in the figures and described in detail, any symmetrical arrangement of cells may be used. For instance, greater standardization of ceramic units from which the stripper is built up may be obtained using square or hexoganal cross-section cells. In this case care must be exercised in placing and sizing the cut-outs for disposal of solids discharged from the bottom of cells at a distance from outlet pipe 5. Figure 2 is a vertical cross-sectional view of Figure 1 at plane XX.

If desired the stripping means may be placed in a vessel separate from the reaction zone. In this case occluded gas removed from the circulating solids by operation of the stripper may be collected separately from the product gas from the reaction vessel.

Any ceramic material of the desired refractory properties may be employed in manufacturing the units from which the stripper is assembled. Ordinary refractory brick is suitable for relatively low temperatures. Silica, Carborundum, or the like may be used for higher temperature operations. The proper refractory material for any particular adaptation will be apparent to one skilled in the art.

It is a feature of this invention that the stripper may be built up of standardized units, and that these may be stacked so as to give vertical cells of the desired height. The cells will normally be of similar cross section throughout the height of the stripper, so that the units must be shaped so as to form continuous vertical cells when stacked, as indicated in the figures. More or less standardization of building units can be obtained depending on the form of assembly, as discussed above. Units should be made so that when stacked in place they are firmly wedged or locked in position in order to prevent vibration or movement during operation. Suitable brackets and/or special forms of vessel internal insulating lining, as shown in Figure 1, may be installed on the cone (which can be cooled and is therefore normally of metallic construction) to provide footing for the stacked stripper units. Details of mechanical construction of equiment for embodiment of my process will be easily developed by those skilled in the art of refractory material utilization.

My invention may be applied to various processes (in addition to those previously mentioned) as for example the distillation and/or carbonization of coal, tar sands, oil-shale, petroleum residua, where temperatures higher than can be handled in steel are used; the pyrolysis of hydrocarbons at high temperatures, as for example in the production of acetylene and butadiene, or the thermal treatment of methane for manufacture of higher boiling hydrocarbons; and any other high temperature operation for which the circulating fluid solids technique is applicable.

The process of my invention is not to be limited by any theory as to mode of operation, but only in and by the following claims in which it is desired to claim all novelty insofar as the prior art permits.

I claim:
1. Improved apparatus for stripping occluded gases from a moving hot stream of fluidized solid particles which comprises a vertical treating vessel adapted for operation at a temperature level of from about 1800° F. to 3000° F., above the range in which metals have practical utility for structural purposes, means for introducing gases to the bottom of said vessel and means for withdrawing gases from the top of said vessel, means for introducing subdivided solids into said vessel, means for withdrawing hot fluidized solids from said vessel, said last-named means comprising a plurality of ceramic elements stacked in a bottom portion of said vessel so as to form a plurality of parallel vertical flow channels open at the top, said elements arranged in parallel with parallel vertical walls so as to be subjected to substantially only compressive stress, each element supported essentially from below by nonmetallic supporting means forming a portion of said solids withdrawal means, said elements cooperating to provide in horizontal cross-section within said solids withdrawal means a cell structure whereby during continued exposure to the abrasive action of said moving hot particles a stream of said particles withdrawn from said treating vessel at said temperature level is split into a plurality of separate streams moving downwardly in parallel into and through said vertical channels, with separate means arranged in a lower portion of each of said channels for introducing hot stripping gases thereto, and means for withdrawing hot fluidized solids from each of said channels downwardly by gravity through cut-outs in the bottom portions of said ceramic elements into a common withdrawal line at the bottom of said treating vessel.

2. Apparatus according to claim 1 wherein means are provided for separately controlling the rates of stripping gas introduced into each of said parallel vertical channels.

3. Apparatus according to claim 1 in which said vertical channels are concentrically arranged and said ceramic elements consist of radially symmetrical stacks of a plurality of separate preformed elements.

FRANK T. BARR.

REFERENCES CITED

The following references are of record in the file of this patent:

UNITED STATES PATENTS

| Number | Name | Date |
|---|---|---|
| 2,394,814 | Snuggs | Feb. 13, 1946 |
| 2,425,754 | Murphree et al. | Aug. 19, 1947 |
| 2,436,225 | Ogorzaly et al. | Feb. 17, 1948 |
| 2,521,195 | Wheeler, Jr. | Sept. 5, 1950 |